United States Patent
Guo et al.

(10) Patent No.: US 7,290,195 B2
(45) Date of Patent: Oct. 30, 2007

(54) ADAPTIVE ACKNOWLEDGMENT DELAY

(75) Inventors: Zihua Guo, Beijing (CN); Richard Yao, Morris Plains, NJ (US); Wenwu Zhu, Basking Ridge, NJ (US); Xin Liu, Beijing (CN)

(73) Assignee: Microsoft Corporation, Redmond, WA (US)

(*) Notice: Subject to any disclaimer, the term of this patent is extended or adjusted under 35 U.S.C. 154(b) by 686 days.

(21) Appl. No.: 10/794,330

(22) Filed: Mar. 5, 2004

(65) Prior Publication Data

US 2005/0204247 A1    Sep. 15, 2005

(51) Int. Cl.
*H04L 1/18* (2006.01)
(52) U.S. Cl. ............................ 714/749; 714/762
(58) Field of Classification Search ............... 714/749, 714/762
See application file for complete search history.

(56) References Cited

U.S. PATENT DOCUMENTS

| | | | |
|---|---|---|---|
| 6,992,982 B1 * | 1/2006 | Meyer et al. | 370/231 |
| 6,996,083 B1 * | 2/2006 | Balachandran et al. | 370/337 |
| 7,096,400 B2 * | 8/2006 | Lim et al. | 714/748 |
| 2002/0165973 A1 * | 11/2002 | Ben-Yehezkel et al. | 709/230 |
| 2003/0174700 A1 * | 9/2003 | Ofek et al. | 370/389 |
| 2004/0190552 A1 * | 9/2004 | Kim et al. | 370/469 |

OTHER PUBLICATIONS

Draft Standard for Telecommunications and Information Exchange Between Systems- LAN/MAN Specific Requirements- Part 15.3: Wireless Medium Access Control (MAC) and Physical Layer (PHY) Specifications for High Rate Wireless Perosnal Area Networks (WPAN), Draft P802.15.3/D17, Feb. 2003,.340 pages.

* cited by examiner

*Primary Examiner*—Guy Lamarre
*Assistant Examiner*—Mujtaba M. Chaudry
(74) *Attorney, Agent, or Firm*—Lee & Hayes, PLLC

(57) ABSTRACT

Adaptive acknowledgement delay entails adaptively adjusting an acknowledgement delay period responsive to channel quality. A destination device is enabled to set the acknowledgment delay period between two successive acknowledgments that acknowledge blocks received from a source device over a wireless channel. In a described implementation, the acknowledgment delay period is decreased if the wireless channel quality is poor. Otherwise, the acknowledgment delay period is increased as bounded by a maximum acknowledgment delay period setting and a remaining number of unreceived blocks of a current suprablock. The quality of the wireless channel may be reflected by, for example, blocks that are received erroneously. The duration of the acknowledgment delay may be set in terms of number of blocks received at the destination device.

16 Claims, 9 Drawing Sheets

FIG. 3A  IMM-ACK POLICY

FIG. 3B  NO-ACK POLICY

FIG. 3C  DLY-ACK POLICY

| 4 | 2 | ••• | 2 | 1 | 1 | 1 | 10 |
|---|---|-----|---|---|---|---|----|
| FCS | MPDU ID-x | ••• | MPDU ID-1 | MPDUs ACKed | Max Frames | Max Burst | MAC Header |

DLY-ACK FRAME FORMAT

BURST ACK POLICY 600

| BLOCK (m-1) 508 (m-1) | BLOCK (m) 508 (m) | BLOCK (m+1) 508 (m+1) | BURST ACK 604 |

FIG. 6

BURST ACK TRANSMISSION FORMAT 700

| HEADER 702 | BLOCK ID—(m+1) 708(m+1) | BLOCK ID—(m) 708(m) | BLOCK ID—(m-1) 708(m-1) | BLOCKS ACKed 704 | BURST VALUE 706 | ••• 710 |

ADAPTIVE ACKNOWLEDGMENT DELAY

TECHNICAL FIELD

This disclosure relates in general to adaptively delaying acknowledgments and in particular, by way of example but not limitation, to adaptively delaying acknowledgments to received wireless communications wherein the acknowledgment delay period is set responsive to channel quality.

BACKGROUND

Computer networks have facilitated the exchange of information for decades. Such computer networks include both wired networks and wireless networks. Historically, wired networks such as local area networks (LANs) that operate in accordance with e.g. an IEEE 802.3 standard were commonly created. Recently wireless networks that operate in accordance with e.g. an IEEE 802.11 or 802.15 standard are becoming more prevalent. Wireless networks that comport with IEEE 802.11 are typically referred to as wireless LANs (WLANs). Wireless networks that comport with IEEE 802.15.3 are typically referred to as wireless personal area networks (WPANs).

IEEE 802.15.3 in particular defines a physical layer and a Medium Access Control (MAC) layer for WPAN systems. WPAN typically relates to wireless ad hoc networks that allow a number of devices to communicate with each other. Such networks are often termed piconets. A set of devices forming a given piconet share a limited available communication bandwidth using a wireless channel. Each wireless communication involves a transmission that is sent from a received at a receiver or destination side. After successful reception across the wireless channel, the transmission may be acknowledged.

Three acknowledgment (ACK) policies are defined in IEEE 802.15.3. These three ACK policies are: Immediate ACK (Imm-ACK), No-ACK, and Delayed ACK (Dly-ACK). Imm-ACK specifies that an acknowledgment is to be sent from the destination side to the source side after each received unit. No-ACK enables the omission of acknowledgments. Dly-ACK specifies that an acknowledgment is to be sent after each specified number of received units. This specified number of received units between two successive acknowledgments may be changed. However, the IEEE 802.15.3 standard is open with regard to specifying the number of received units, or delay period, between acknowledgments.

Accordingly, there is a need for schemes and/or techniques that can set the delay period between acknowledgments in an efficient and/or productive manner.

SUMMARY

Adaptive acknowledgment delay entails adaptively adjusting an acknowledgment delay period responsive to channel quality. A destination device is enabled to set the acknowledgment delay period between two successive acknowledgments that acknowledge blocks received from a source device over a wireless channel. In a described implementation, the acknowledgment delay period is decreased if the wireless channel quality is poor. Otherwise, the acknowledgment delay period is increased as bounded by a maximum acknowledgment delay period setting and a remaining number of unreceived blocks of a current suprablock. The quality of the wireless channel may be reflected by, for example, blocks that are received erroneously. The duration of the acknowledgment delay period may be set in terms of number of blocks received at the destination device.

Other method, system, approach, apparatus, device, media, procedure, arrangement, etc. implementations are described herein.

BRIEF DESCRIPTION OF THE DRAWINGS

The same numbers are used throughout the drawings to reference like and/or corresponding aspects, features, and components.

FIGS. 3A, 3B, and 3C illustrate exemplary Imm-ACK, No-ACK, and Dly-ACK policies respectively in accordance with an IEEE 802.15.3 standard.

DETAILED DESCRIPTION

Figure 1:
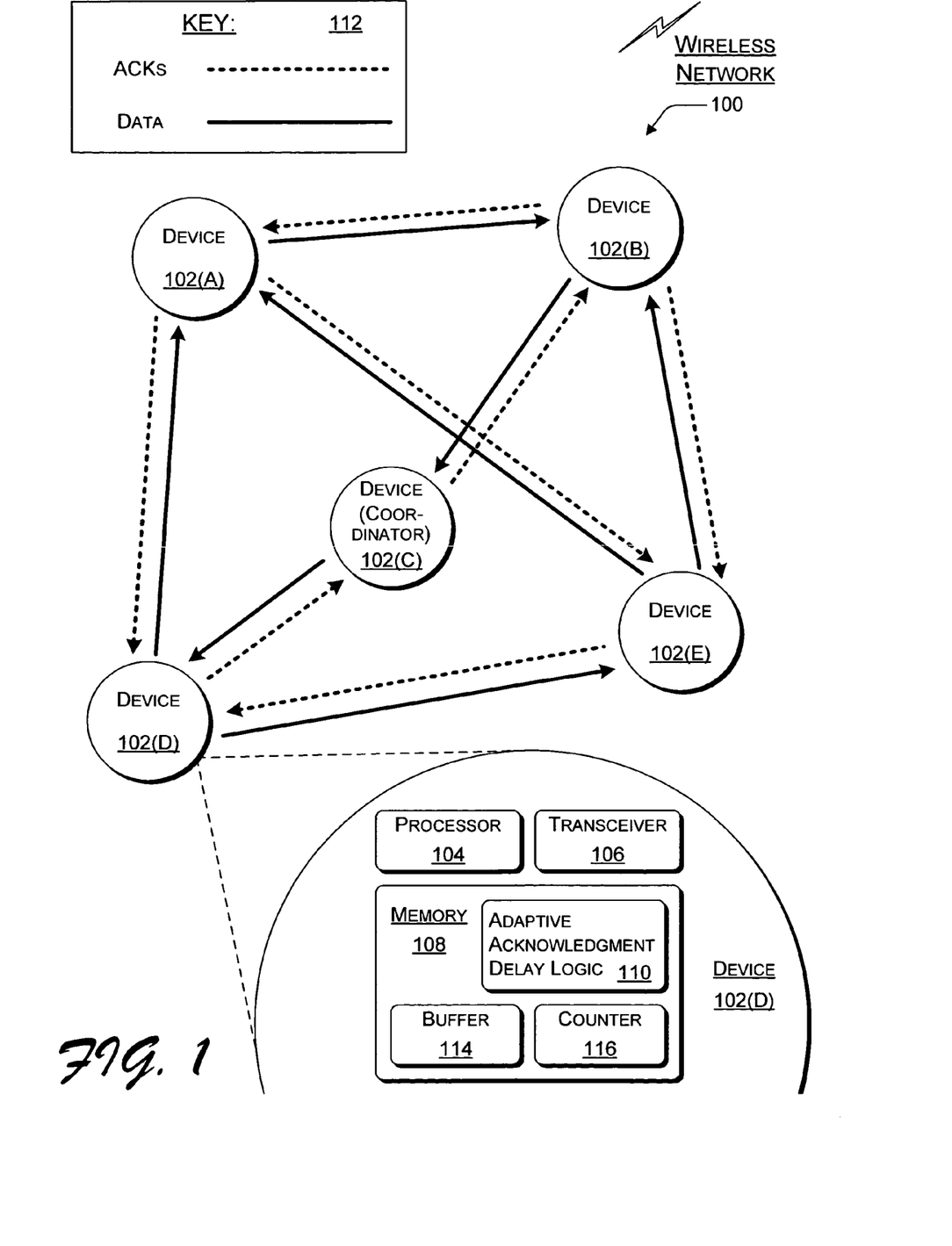
FIG. 1 is an exemplary wireless network formed from multiple devices, and it illustrates exemplary components of a device.

FIG. 1 is an exemplary wireless network 100 formed from multiple devices 102, and it illustrates exemplary components of a device 102(D). Wireless network 100 includes five devices 102 that are capable of wireless communication; however, a different number of devices 102 may alternatively form wireless network 100. As indicated by a key 112, data communications are represented by solid lines, and acknowledgment (ACK) communications are represented by dashed lines.

In a described implementation, each device 102 is capable of forming and/or participating in an ad hoc wireless network. Each device 102 may be a laptop computer, a mobile phone, a personal digital assistant (PDA), an input device, and so forth. Other exemplary realizations for devices 102 are described further below with reference to FIG. 11.

Each device 102 may be similar to or different from each other device 102 in terms of size/shape, intended purpose, processing ability, programming, and so forth. Regardless, one device 102 is established as the device coordinator 102. For example, the most powerful device 102 may be selected as the device coordinator 102. Among other possible coordination functions, the device coordinator may be responsible for any one or more of system timing, quality of service (QoS) control, power management, security, bandwidth allocation among devices 102 for the wireless communications within wireless network 100, and so forth.

As illustrated, device 102(C) is the designated device coordinator 102(C), and devices 102(A,B,D,E) are functioning as general devices 102(A,B,D,E). Each device 102 may act as a sending or source device by transmitting data (solid arrows) to another device 102 and receiving ACKs (dashed arrows) in return. Similarly, each device 102 may act as a receiving or destination device by receiving data (solid arrows) from another device 102 and transmitting ACKs (dashed arrows) back to the other device 102 in response to the received data. For example, device 102(D) is shown acting as a destination device with respect to device 102(C) by receiving data transmissions from device 102(C) and transmitting ACKs back to device 102(C). Also, device 102(D) is shown acting as a source device with respect to device 102(E) by sending data transmissions to device 102(E) and receiving ACKs in response therefrom.

Each device 102, such as device 102(D), includes a processor 104, a transceiver 106, and a memory 108. A transmitter and/or receiver (i.e., a transceiver) 106 is capable of sending/transmitting wireless communications from and receiving wireless communications at device 102(D). Memory 108 includes processor-executable instructions that are executable by processor 104 to effectuate particular device 102 functions.

At least for device 102(D), memory 108 includes adaptive acknowledgment delay logic 110, which may comprise processor-executable instructions. More generally, acknowledgment delay logic 110 may comprise hardware, software, firmware, or analog component(s), some combination thereof, and so forth. Memory 108 also includes a buffer 114 and a counter 116, both of which are applicable to an adaptive ACK delay implementation described further below with reference to FIG. 10. Additional exemplary components, aspects, etc. for devices 102 are described further below with reference to FIG. 11.

By way of example only, wireless network 100 may be realized as a piconet operating in accordance with a WPAN of an IEEE 802.15.3 standard. As such, each device 102 may be realized as a basic component of a piconet, which is termed a device (DEV). Thus, device coordinator 102(C) may be realized as a piconet coordinator (PNC) that performs the central controlling functionalities of the piconet. An exemplary delayed ACK scenario is first described in the context of WPANs and an IEEE 802.15.3 standard with reference to FIGS. 2-4. An exemplary delayed ACK scenario, including exemplary adaptive acknowledgment delay procedures and methods, is next described in the context of wireless systems generally with reference to FIGS. 5-10.

Figure 2:
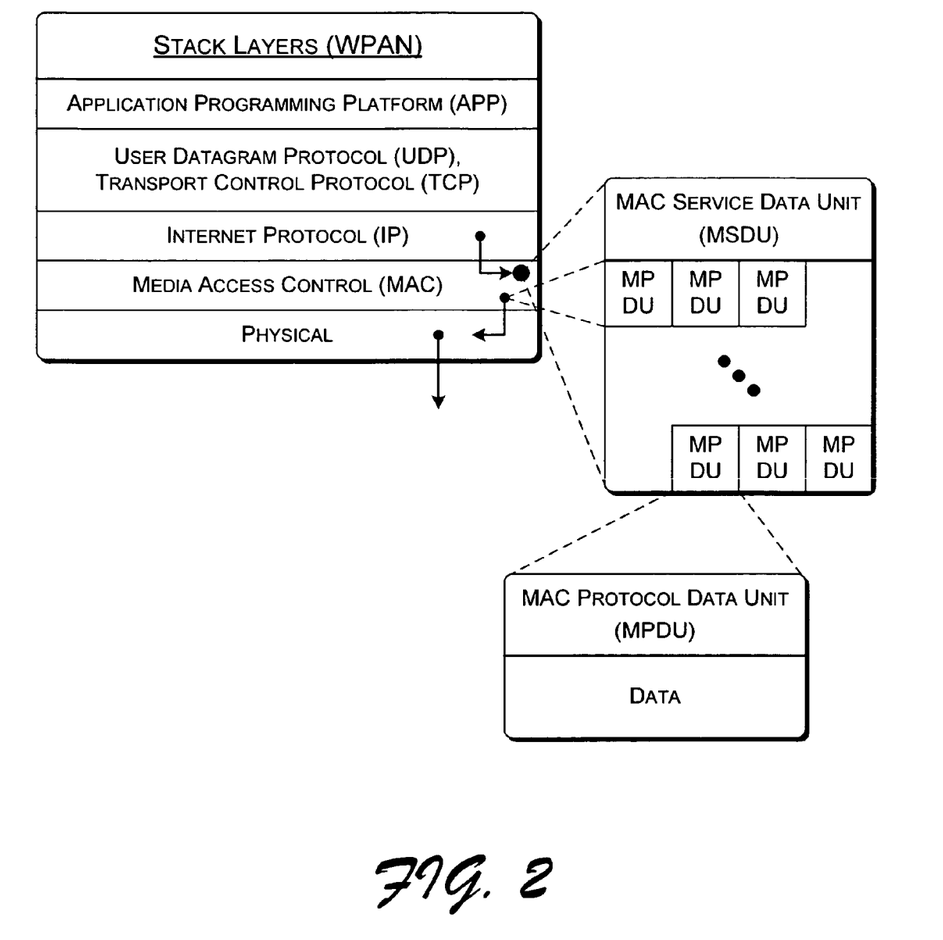
FIG. 2 illustrates exemplary stack layers and data units for a wireless personal area network (WPAN).

FIG. 2 illustrates exemplary stack layers and data units for a WPAN. The stack layers for the WPAN include an application programming platform (APP) layer, a user datagram protocol (UDP) or Transport Control Protocol (TCP) layer, an internet protocol (IP) layer, a MAC layer, and a physical layer. Under an IEEE 802.15.3 standard, the MAC layer adheres to a time division multiple access (TDMA) technology to share available wireless bandwidth. As illustrated, the data units include a MAC service data unit (MSDU) that can be fragmented into multiple MAC protocol data units (MPDUs).

In order to handle relatively large data frames from layers above the MAC layer, the IEEE 802.15.3 standard defines the fragmentation of these large data frames at the MAC layer by a source device (and their defragmentation at the MAC layer by a destination device). Thus, the larger data frames termed MSDUs are fragmented into the smaller data frames termed MPDUs to facilitate transmission in the MAC layer. For example, an MSDU that is 50 k in size may be fragmented into 25-40 MPDUs that are each 1-2K in size.

Each MSDU is associated with an MSDU identification (ID). The fragments of each given MSDU are numbered with a sequence number that is unique within each given MSDU. Hence, an MPDU ID may be formed from the MSDU ID and the fragment sequence number (e.g. via concatenation or some other combining mechanism).

As noted above, in order to transmit the MPDUs in the MAC layer, three MAC layer ACK policies are defined in the IEEE 802.15.3 standard. These three ACK policies are Imm-ACK, No-ACK, and Dly-ACK. The Imm-ACK policy provides an ACK process in which each MPDU is individually ACKed following the reception of the MPDU frame. A No-ACK policy denotes a process in which no ACK frame follows an MPDU frame. The Dly-ACK policy is a tradeoff between the Imm-ACK and the No-ACK policies. The Dly-ACK policy enables a source device to send multiple MPDU frames to a destination device without receiving intervening ACKs. The ACKs of the individual MPDU frames are then grouped into a single Dly-ACK response frame by the destination device; the single Dly-ACK response frame is then sent back to the source device from the destination device.

Figure 3A:
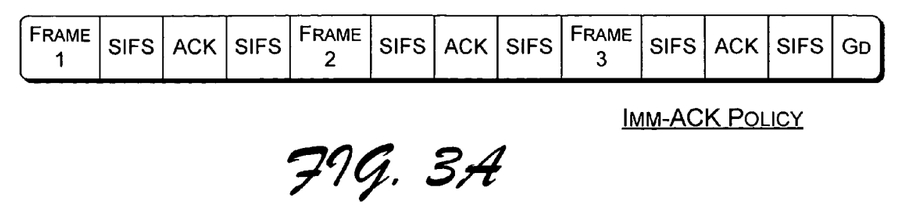
Figure 3B:
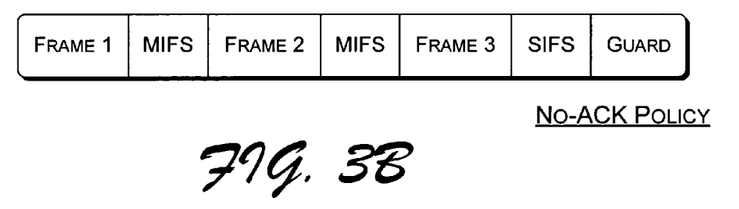
Figure 3C:
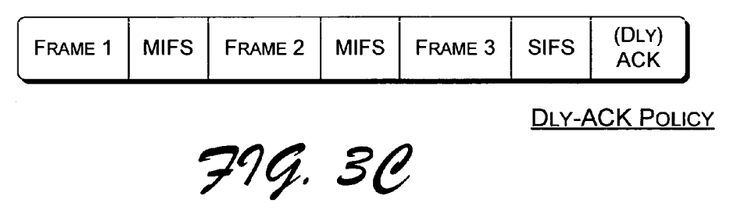

FIGS. 3A, 3B, and 3C illustrate exemplary Imm-ACK, No-ACK, and Dly-ACK policies respectively in accordance with an IEEE 802.15.3 standard. In the Imm-ACK policy of FIG. 3A, frame 1, frame 2, and frame 3 are each followed by a respective ACK. In between each frame and/or ACK transmission, a short inter-frame space (SIFS) is also present. A guard (Gd) time between channel time allocation periods may also be included.

In the No-ACK policy of FIG. 3B, frame 1 is followed by frame 2 is followed by frame 3 without intervening or other ACK transmissions. A minimum inter-frame space (MIFS) is located after frames 1 and 2, and a SIFS is located after frame 3. Again, a guard time may also be located between channel time allocation periods. In the Dly-ACK policy of FIG. 3C, frame 1 is followed by frame 2 is followed by frame 3, without successive intervening ACK transmissions. The Dly-ACK policy is therefore similar to the No-ACK policy in this respect. However, a delayed ACK is transmitted after frame 3. The delayed ACK includes acknowledgment information related to the group of frames 1, 2, and 3.

The number of frames in the ACK grouping, or the size of the ACK group, may be generally termed the maximum burst size of the Dly-ACK. A destination device may change the maximum burst size for each burst grouping to tune system performance. This maximum burst size may be set by the destination device using a field in the Dly-ACK frame format when the Dly-ACK is transmitted to the source device.

Figure 4:
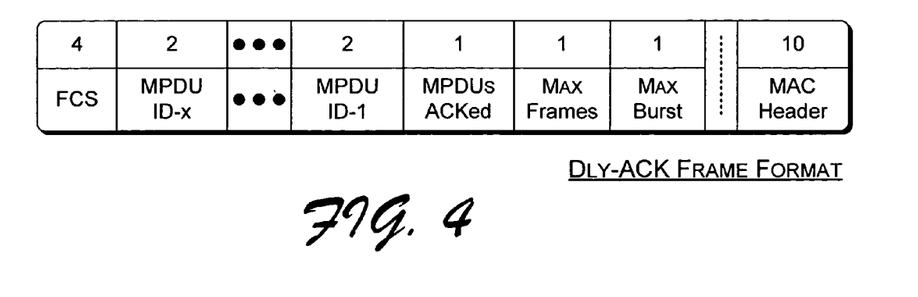
FIG. 4 illustrates an exemplary Dly-ACK frame format in accordance with an IEEE 802.15.3 standard.

FIG. 4 illustrates an exemplary Dly-ACK frame format in accordance with an IEEE 802.15.3 standard. The Dly-ACK frame format includes a frame check sequence (FCS) (occupying 4 octets), the MPDU IDs of frames being ACKed (occupying 2 octets per MPDU), the MPDUs ACKed (1 octet), the maximum frames (1 octet), the maximum burst grouping (1 octet), and a MAC header (10 octets).

As shown in FIG. 4 and as indicated by the ellipses, MPDUs with IDs from "x" down to "1" are being ACKed in the illustrated Dly-ACK frame format. Also, as indicated by the field preceding the MAC header and having a vertical dashed line, one or more other fields at various position(s) in the frame may alternatively be included. The max burst field occupying one octet specifies the number of frames to be included in the next delayed acknowledgment grouping.

Adjusting the burst size responsive to channel quality is described further below in the context of wireless network communications generally with reference to FIGS. 5-10.

The Imm-ACK and No-ACK policies of FIGS. 3A and 3B, respectively, can be considered as special cases of the Dly-ACK policy with burst size being set to one and to infinity, respectively. The larger the burst size, the smaller the overall overhead incurred by the individual ACK frames because they are fewer in number. By way of explanation, in wireless systems the physical layer header and the MAC header are usually rather significant and are present regardless of the size of the MAC payload. Hence, using the Imm-ACK policy or issuing ACKs too frequently in general can adversely impact efficient spectrum utilization.

Consequently, from the MAC layer point of view, larger burst sizes are advantageous because less MAC overhead is occupied as a percentage of the total transmission bandwidth. However, from an upper layer point of view, larger burst sizes may not be as advantageous. For example with real-time video streaming, if the burst size is too large, an MPDU that is received erroneously due to a wireless channel error may not be retransmitted sufficiently quickly or soon. This can cause the MPDU, and potentially the entire MSDU when it is to be decoded as a whole, to miss a deadline imposed by an application at the application layer. Consequently, the QoS at the application layer can be degraded.

Job failure rate (JFR) is usually a factor in the QoS performance of real-time video streaming over IEEE 802.15.3 systems. Different implementations of Dly-ACK policies can impact the JFR differently. For example, reducing the JFR by tuning a Dly-ACK policy can improve the QoS of real-time video streaming at the application layer in certain implementations. In a described implementation for IEEE 802.15.3 wireless networks, the burst size of the Dly-ACK, or the acknowledgment delay period, is dynamically changed based on the wireless channel condition to balance the JFR against efficient bandwidth utilization.

Figure 5:
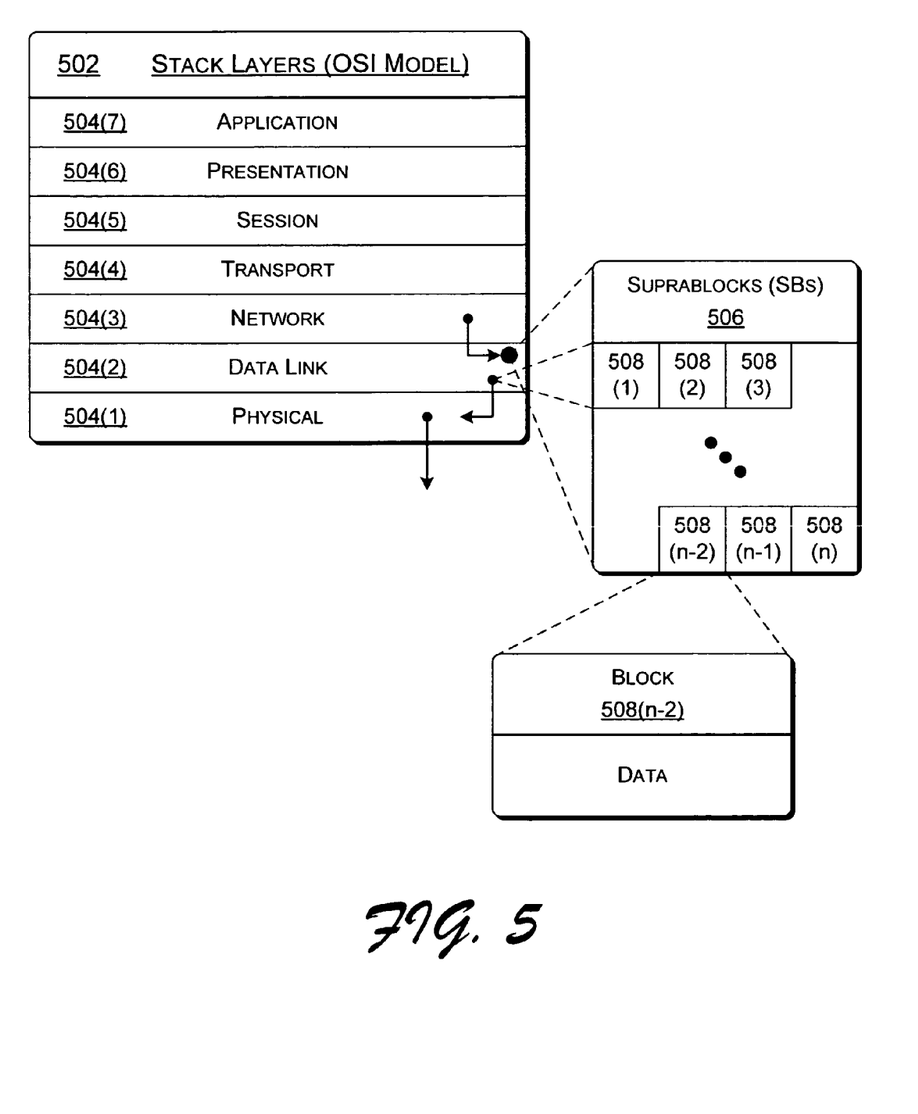
FIG. 5 illustrates exemplary stack layers and data block divisions for wireless networks generally.

FIG. 5 illustrates exemplary stack layers 502 and exemplary data block divisions 506 and 508 for wireless networks generally. Stack layers 502 are based on the open systems interconnection (OSI) networking framework model that identifies seven layers 504(1-7). Specifically, stack layers 502 include an application layer 504(7), a presentation layer 504(6), a session layer 504(5), a transport layer 504(4), a network layer 504(3), a data link layer 504(2), and a physical layer 504(1).

Application layer 504(7) represents the layer at which QoS issues may be observed by a user for real-time video streaming across a wireless network. Data link layer 504(2) typically provides transmission protocol knowledge and management. Data link layer 504(2) is usually segmented into two sublayers: the MAC layer and a logical link control (LLC) layer.

Data link layer 504(2) accepts relatively larger suprablocks (SBs) 506 from a higher layer such as network layer 504(3). To facilitate transmission, data link layer 504(2) fragments each suprablock 506 into multiple blocks 508. As illustrated, suprablock 506 is divided into blocks 508(1), 508(2), 508(3) . . . 508(n−2), 508(n−1), 508(n).

Each suprablock 506 is associated with a suprablock identifier (ID). Each block 508 is associated with a sequence number that is unique within each suprablock 506. Hence, each block 508 is associated with a block ID that is formed from the sequence number thereof and the suprablock ID of which the block 508 forms a portion. The combination of the sequence number and the suprablock ID to form the block ID may be through concatenation or some other mechanism.

As shown with block 508(n−2), each block 508 includes data as at least part of the payload. After fragmentation, data link layer 504(2) forwards each block 508 with the payload data to a lower layer such as physical layer 504(1). Physical layer 504(1) subsequently forwards blocks 508 onto the physical layer for wireless propagation from a source device to a destination device. At the destination device, a data link layer 504(2) thereof defragments blocks 508 to reform suprablock 506.

Figure 6:
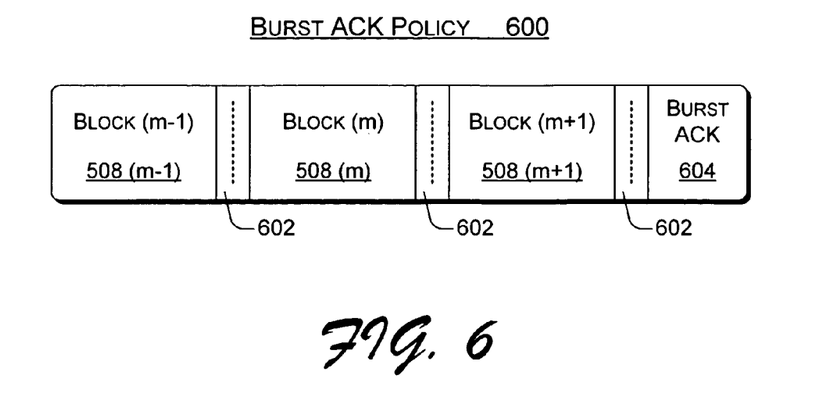
FIG. 6 illustrates an exemplary burst ACK policy for wireless networks generally.

FIG. 6 illustrates an exemplary burst ACK policy 600 for wireless networks generally. Burst ACK policy 600 includes a block (m−1) 508(m−1) which is followed by a block (m) 508(m) which is followed by a block (m+1) 508(m+1) without intervening ACKs. Burst ACK 604 follows blocks 508(m−1), 508(m), and 508(m+1) and serves to acknowledge receipt of the burst grouping of three blocks (m−1), (m), and (m+1).

As indicated by fields 602 that have vertical dashed lines, fields other than ACKs may exist between the multiple blocks 508(m−1), 508(m), and 508(m+1). For example, temporal placeholders between transmissions for blocks 508(m−1), 508(m), and 508(m+1) may be present in burst ACK policy 600. Also, although only three blocks 508(m−1), 508(m), and 508(m+1) are illustrated, more or fewer than three blocks may be transceived for each burst group, as set by the burst value. In a described implementation, the burst value is set by a destination device in a burst ACK transmission 700 as is described below with reference to FIG. 7.

Figure 7:
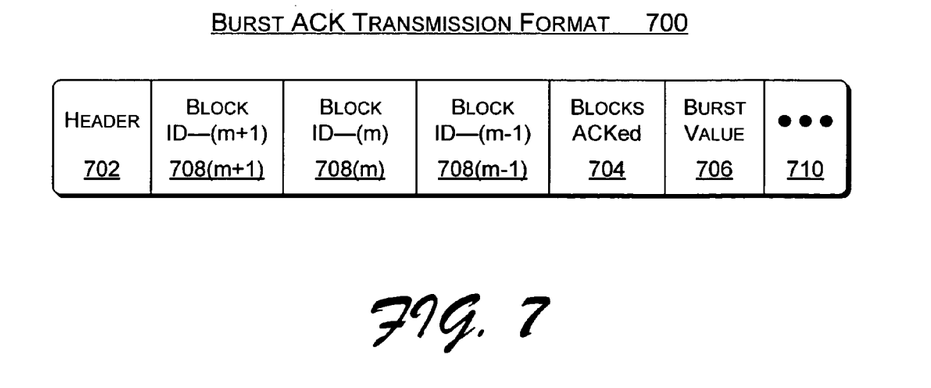
FIG. 7 illustrates an exemplary burst ACK transmission format for wireless networks generally.

FIG. 7 illustrates an exemplary burst ACK transmission format 700 for wireless networks generally. Burst ACK transmission format 700 includes a header 702, a block ID—m+1) 708(m+1), a block ID-(m) 708(m), a block ID—(m−1) 708(m−1), a blocks ACKed field 704, and a burst value field 706. As indicated by the field 710 having the ellipses, other fields may also be present in burst ACK transmission format 700. Also, the order of the fields may be altered.

As is described above with reference to FIG. 5, each block ID 708 is formed from the sequence number of the associated block 508 and the corresponding suprablock ID of a suprablock 506 of which the associated block 508 forms a portion. In a described implementation, each block ID 708 is formed by the concatenation of its associated sequence number and the corresponding suprablock ID.

Burst value 706 sets (i.e., adjusts) the number of blocks 508 that are to be transmitted in each burst grouping. Adjusting burst value 706 therefore adjusts the ACK delay period. In implementations described below with reference to FIGS. 8-10, burst value 706 is adaptively adjusted responsive to wireless channel quality.

By way of example only, burst ACK policy 600 (of FIG. 6) may be realized as the Dly-ACK policy of FIG. 3C for an IEEE 802.15.3 standard. Similarly, blocks 508 (of FIG. 5) may be realized as the frames of FIG. 3C, and burst ACK 604 may be realized as the "(Dly) ACK" field of FIG. 3C. Also, burst ACK transmission format 700 (of FIG. 7) may be realized as the Dly-ACK frame format of FIG. 4 for an IEEE 802.15.3 standard. Similarly, block IDs 708 may be realized as the MPDU IDs of FIG. 4, and burst value field 706 may be realized as the maximum burst field of FIG. 4.

Figure 8:
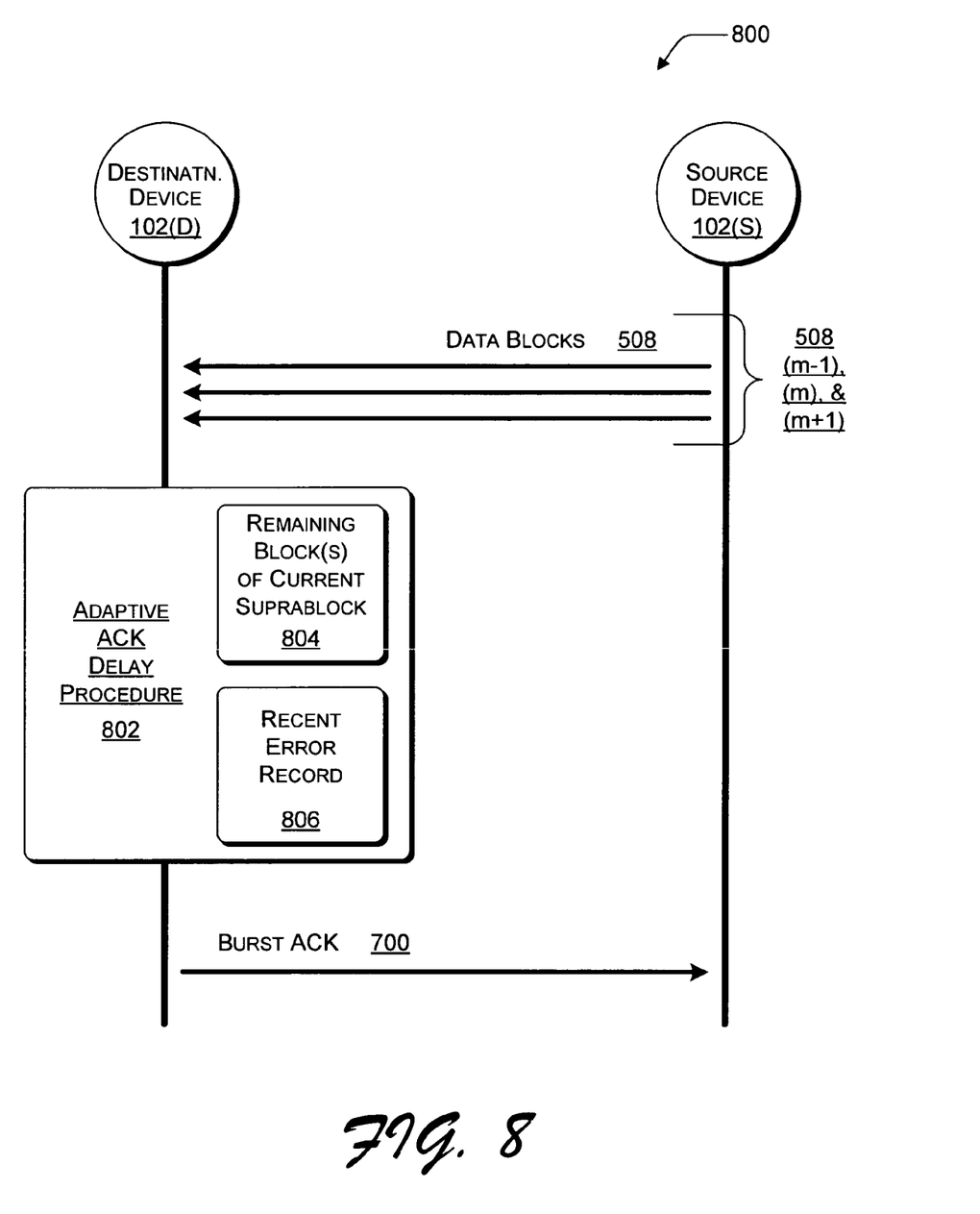
FIG. 8 is an exemplary sequence diagram illustrating adaptive acknowledgment delay by a destination device with regard to a source device.

FIG. 8 is an exemplary sequence diagram 800 illustrating adaptive ACK delay by a destination device 102(D) with regard to a source device 102(S). Source device 102(S) sends multiple data blocks 508 to destination device 102(D). As illustrated, source device 102(S) transmits blocks 508

(m−1), 508(m), and 508(m+1) to destination device 102(D). Destination device 102(D) performs an adaptive ACK delay procedure 802 to adapt the ACK delay period responsive to channel quality. After adaptive ACK delay procedure 802, destination device 102(D) transmits burst ACK 700 to source device 102(S).

In a described implementation, destination device 102(D) has access to (e.g., by tracking, by calculating, and/or by retrieving from memory) remaining block(s) of a current suprablock 804 and a recent error record 806. Recent error record 806 relates to blocks 508 that have been recently received at destination device 102(D) in error. For example, recent error record 806 tracks the number of blocks 508 that have been received recently in error, with recently being determined in relation to a particular number of blocks 508.

Adaptive ACK delay procedure 802 is performed by destination device 102(D) based on remaining block(s) of a current suprablock 804 and responsive to recent error record 806. Thus, adaptive ACK delay procedure 802 adjusts burst value 706 based on remaining block(s) of a current suprablock 804 and responsive to recent error record 806. The adjusted burst value 706 resulting from adaptive ACK delay procedure 802 is sent to source device 102(S) from destination device 102(D) via burst ACK 700.

Figure 9:
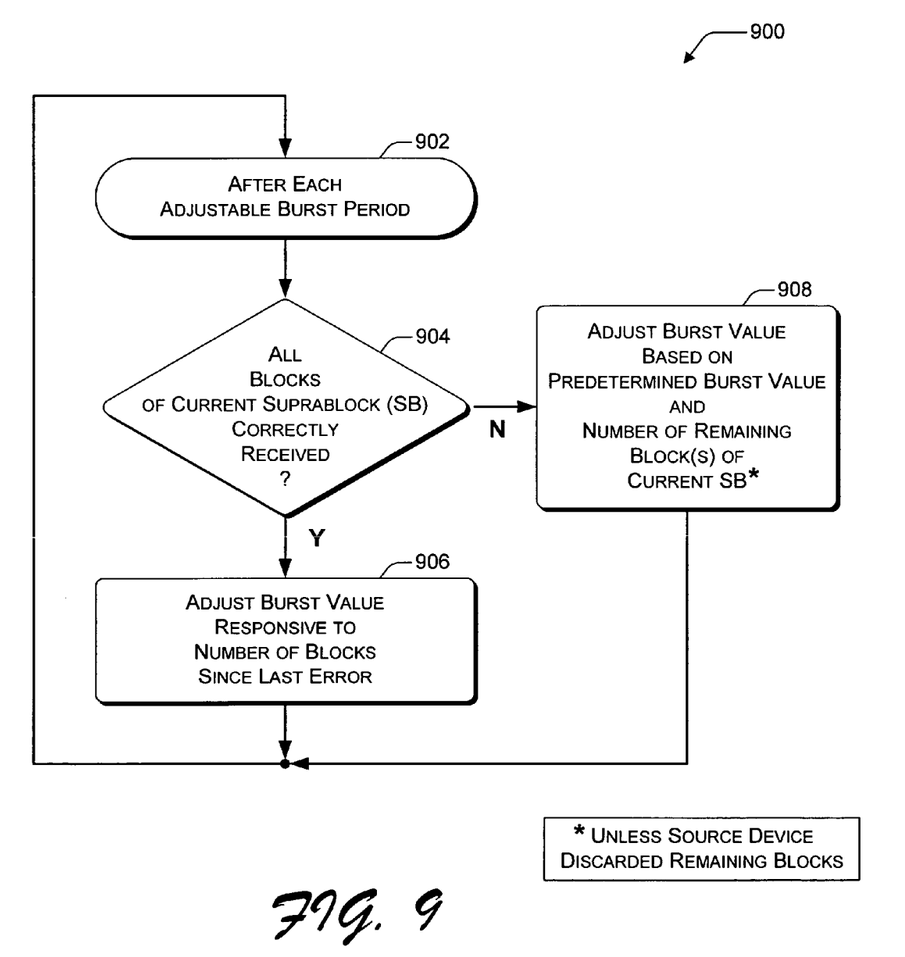
FIG. 9 is a flow diagram that illustrates an exemplary method for adaptive acknowledgment delay.

FIG. 9 is a flow diagram 900 that illustrates an exemplary method for adaptive ACK delay. Flow diagram 900 includes four (4) blocks. Although the actions of blocks 902-908 may be performed in other implementations and environments, FIGS. 1 and 5-8 are used in particular to illuminate certain aspects of the method. For example, the actions of flow diagram 900 may be performed by a destination device 102(D).

In a described implementation and as indicated at starting block 902, the method of flow diagram 900 is repeated after each adjustable burst period. For example, destination device 102(D) may repeat the method at the end of each ACK delay period. At block 904, it is determined if all blocks of a current suprablock have been correctly received. For example, it may be determined if all blocks 508 of a current suprablock 506 have been correctly received at destination device 102(D).

If all blocks of the current suprablock have been correctly received (as determined at block 904), then at block 906 a burst value for the (next) acknowledgment delay period is adjusted responsive to a number of blocks received since the last error. For example, destination device 102(D) may adjust burst value 706 responsive to the number of blocks 508 that have been received since the last block 508 that was received in error.

If, on the other hand, all blocks of the current suprablock have not been correctly received (as determined at block 904), then at block 908 the burst value for the acknowledgment delay period is adjusted based on a predetermined burst value for the maximum acknowledgment delay period and a number of remaining blocks to be received for the current suprablock. For example, destination device 102(D) may adjust burst value 706 based on a maximum allowable burst value and the number of blocks 508 that have yet to be received for the current suprablock 506. The maximum allowable burst value may vary from one implementation to another, and it may be changed from time to time within one implementation, but it is at least occasionally constant from one adjustable burst period to another adjustable burst period.

After the action(s) of block 906 or 908, the method continues at block 902 to await the conclusion of the next adjustable burst period. As indicated by the asterisk in block 908, the action(s) of block 908 are altered if the source device has discarded the remaining blocks of the current suprablock. In other words, the adaptive acknowledgment delay procedure differs if all blocks of the current suprablock have not been received and the source device has started transmitting blocks from a subsequent suprablock. Such alternative actions, as well as additional elaborations on the method of flow diagram 900, are described further below with reference to FIG. 10.

Figure 10:
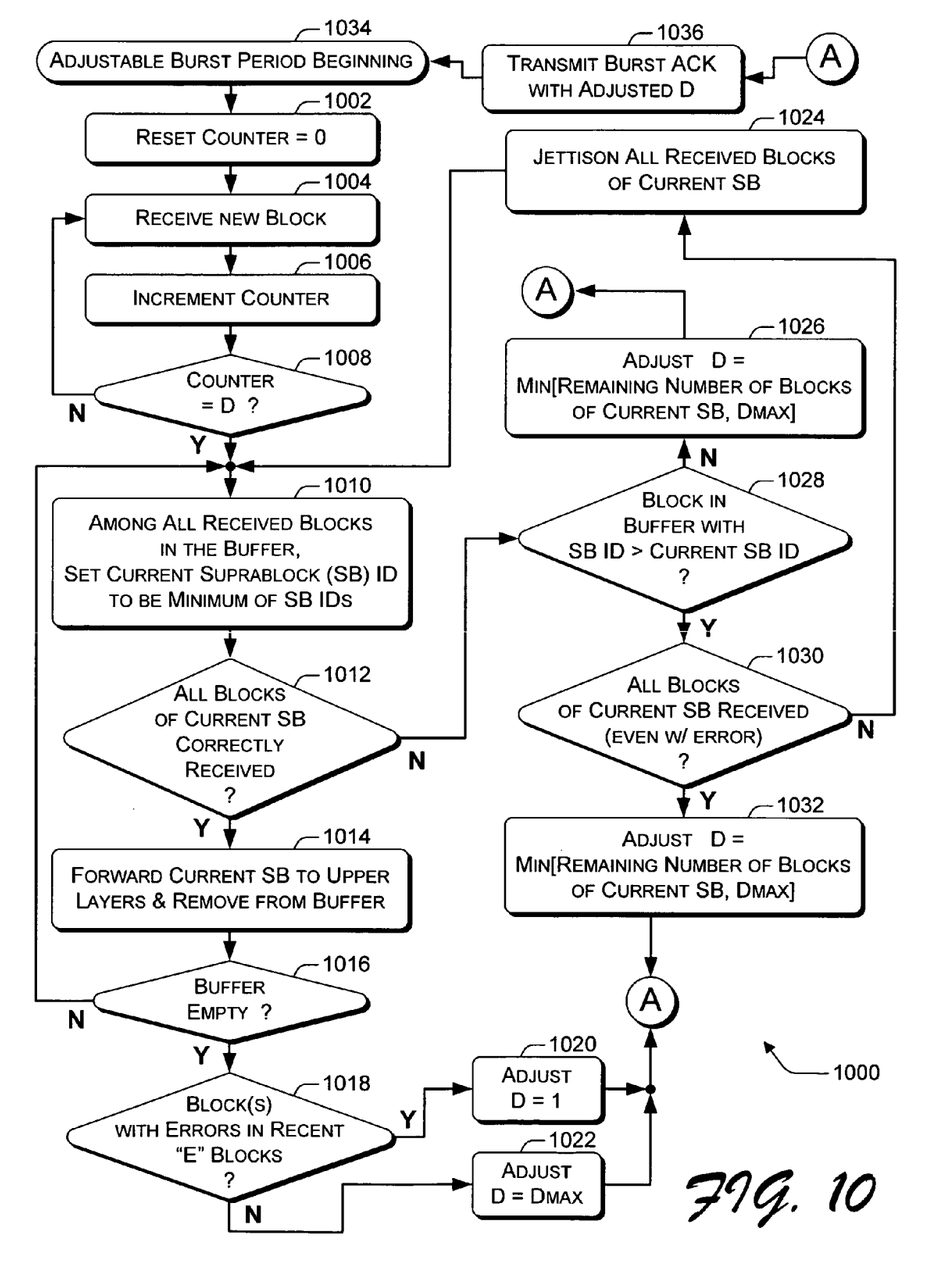
FIG. 10 is a flow diagram that illustrates another exemplary method for adaptive acknowledgment delay.

FIG. 10 is a flow diagram 1000 that illustrates another exemplary method for adaptive ACK delay. Flow diagram 1000 includes eighteen (18) blocks 1002-1036. Although the actions of blocks 1002-1036 may be performed in other implementations and environments, FIGS. 1 and 5-9 are used in particular to illuminate certain aspects of the method. For example, the actions of flow diagram 1000 may be performed by a destination device 102(D).

In FIG. 10, a variable "D" represents a delay acknowledgment period or burst value (e.g., that is expressable in numbers of blocks 508). A variable "$D_{max}$" represents a maximum predetermined delay acknowledgment period or burst value. Also, a variable "E" represents an error threshold (e.g., that is expressable in numbers of blocks 508).

As noted above, the larger the burst size, the smaller the overall overhead for ACKs. Consequently, in a described implementation, the burst value D can be set as large as possible, this is indicated by the "$D_{max}$" variable in flow chart 1000. However, erroneous blocks 508 of a suprablock 506 are still retransmitted in a timely manner when the wireless channel is not of a sufficiently high quality.

Thus, when the number of remaining blocks 508 of a current suprablock 506 is less than $D_{max}$, the next burst value D is set to the former. On the other hand, when all of the blocks 508 of the current suprablock 506 have been successfully received, the next burst value D is set to 1 or $D_{max}$, depending on the channel condition as at least partly measured or reflected by the error threshold variable E.

Initially: An adjustable burst period begins (block 1034), and a counter is reset to zero (0) (block 1002). For example, counter 116 in memory 108 of destination device 102(D) may be reset to zero. During the adjustable burst period, a new block is received (block 1004). For example, a new block 508 may be received at destination device 102(D) from a source device 102(S) and placed in buffer 114 of memory 108. With the receipt of the new block, the counter is incremented (block 1006). For example, counter 116 may be incremented. Steps 1-5 are described below with reference to counter 116 and buffer 114.

Step 1: It is determined if counter 116 is equal to D (block 1008). For example, it may be determined if the number of received blocks 508 since the last burst ACK 700 was sent from destination device 102(D) totals the current burst value D.

a) If no, then the method of flow diagram 1000 continues by awaiting receipt of another block 508 (at block 1004).

b) If yes, then the method of flow diagram 1000 continues with step 2 (at block 1010).

Step 2: Among all the received blocks 508 in buffer 114, the suprablock ID of the suprablock 506 with the smallest suprablock ID is set as the current suprablock ID (block 1010).

Step 3: It is determined if all of the blocks 508 of the current suprablock 506 have been correctly received (block 1012). In an IEEE 802.15.3 implementation, for example, the total number of MPDUs in an MSDU can be read from the MAC header of any one of its MPDUs.

a) If yes, the current suprablock 506 is forwarded to an upper layer and the blocks 508 thereof are removed from buffer 114 (block 1014). For example, data link layer 504(2) may forward blocks 508(1) to 508(n) of current suprablock 506 to network layer 504(3). The method of flow diagram 1000 then continues with step 4 (at block 1016).

b) If no, it is determined if there is a block 508 in buffer 114 that is part of a suprablock 506 with a suprablock ID that is greater than the suprablock ID of the current suprablock 506 (block 1028).

i. If no, then the next burst value D is set equal to the minimum of $D_{max}$ and the number of remaining blocks 508 in the current suprablock 506 (block 1026). Although other values may alternatively be used, an exemplary value for $D_{max}$ is ten (10). The method of flow diagram 1000 then continues with step 5 (at block 1036).

ii. If yes, it is determined if all blocks 508 of the current suprablock 506 have been received, even if some were received erroneously (block 1030).

1. If yes, then the next burst value D is set equal to the minimum of $D_{max}$ and the number of remaining blocks 508 in the current suprablock 506 (block 1032). Also, the erroneous blocks 508 of the current suprablock 506 are jettisoned from buffer 114. The method of flow diagram 1000 then continues with step 5 (at block 1036).

2. If no, all blocks 508 of the current suprablock 506 are jettisoned from buffer 114 (block 1024) because it is apparent that the remaining blocks 508 of the current suprablock 506 have already been discarded at the source device 102(S). The method of flow diagram 1000 then continues with step 2 (at block 1010).

Step 4: It is determined if buffer 114 is empty (block 1016).

a) If no, the method of flow diagram 1000 continues with step 2 (at block 1010).

b) If yes, it is determined if there has been one or more blocks 508 that have been erroneously received in the most recent "E" blocks 508 (block 1018). Although other values may alternatively be used, an exemplary value for E is thirty (30).

The variable "E" at least partly establishes the risk aversion of the adaptive ACK delay procedure and may be used to compensate for channels that are quickly changing versus those that are relatively constant. Additionally, multiple adaptive levels may be implemented. For example, the next burst value D may be set equal to a value between $D_{max}$ and 1 if the number of erroneous blocks 508 is nonzero but less than a higher error number cutoff. Alternatively, there may be multiple levels of error thresholds ("Es"). Thus, if the number of received blocks 508 that have been received since the last erroneous block is between first and second thresholds, then the next burst value D may be set equal to a value between $D_{max}$ and 1.

i. If yes, the next burst value D is adjusted to equal one (1) (block 1020). The method of flow diagram 1000 then continues with step 5 (at block 1036).

ii. If no, the next burst value D is adjusted to equal $D_{max}$ (block 1022). The method of flow diagram 1000 then continues with step 5 (at block 1036).

Step 5: Destination device 102(D) generates or formulates a burst ACK 700 with burst value 706 being the next burst value D as adjusted in steps 1-4 above (e.g., at blocks 1020, 1022, 1026, and 1032). Destination device 102(D) then transmits the formulated burst ACK 700 to source device 102(S) over the wireless channel (block 1036).

The following examples illustrate how the method of flow diagram 1000 may be implemented to adaptively adjust a burst ACK variable delay period. Each received block 508 is denoted by the associated block ID 708 that is formed from a pair as follows: (sequence number, suprablock ID).

Example 1 correlates with blocks 1012, 1018, 1020, 1022, etc.: The received blocks in the buffer are (4, 99), (5, 99), and (6, 99). If the total number of blocks of the $99^{th}$ suprablock is 7 (so the maximum block sequence number or index is 6), then if the recent E (e.g., E=30) received blocks are all correct, the next burst value D is set to equal $D_{max}$; otherwise, the next burst value D is set equal to 1.

Example 2 correlates with block 1012, 1028, 1026, etc.: The received blocks in the buffer are (4, 99), (5, 99)—(in error), and (6, 99)—(in error). If the total number of blocks of the $99^{th}$ suprablock is 11 (so the maximum block sequence number or index is 10), then because there are no blocks in the buffer from the $100^{th}$ subrablock and there are two blocks that are in error for the current $99^{th}$ suprablock, the next burst value D is set equal to the minimum of 6 (4+2) and $D_{max}$.

Example 3 correlates with blocks 1012, 1028, 1030, 1032, etc.: The received blocks in the buffer are (4, 99), (5, 99)—(in error), (6, 99)—(in error), (0, 100), and (1, 100). If the total number of blocks in the $99^{th}$ suprablock is 7 (so the maximum block sequence number or index is 6), then, the next burst value D is set equal to the minimum of 2 and $D_{max}$ because there are two erroneous blocks for the current $99^{th}$ suprablock and there are blocks in the buffer from the $100^{th}$ suprablock.

Example 4 correlates with blocks 1012, 1028, 1030, 1024, and then 1010, 1012, 1028, 1026, etc.: The received blocks in the buffer are (4, 99), (5, 99), (6, 99), (0, 100), and (1, 100). If the total number of blocks of the $99^{th}$ suprablock is 11 (so the maximum block sequence number or index is 10), then it is apparent that the source device has discarded the remaining blocks of the $99^{th}$ suprablock (e.g., when the process reaches block 1030). Consequently, blocks (4, 99), (5, 99), and (6, 99) are jettisoned from the buffer. Next, the current suprablock ID is set to 100. If the total number of blocks of the $100^{th}$ suprablock is 15, then the next burst value D is set equal to the minimum of 13 (15–2) and $D_{max}$.

The devices, actions, aspects, features, procedures, components, etc. of FIGS. 1-10 are illustrated in diagrams that are divided into multiple blocks. However, the order, interconnections, interrelationships, layout, etc. in which FIGS. 1-10 are described and/or shown is not intended to be construed as a limitation, and any number of the blocks can be modified, combined, rearranged, augmented, omitted, etc. in any manner to implement one or more systems, methods, devices, procedures, media, apparatuses, arrangements, etc. for adaptive acknowledgment delay implementations. Furthermore, although the description herein includes references to specific implementations (and the exemplary operating environment/device of FIG. 11 below), the illustrated and/or described implementations can be implemented in any suitable hardware, software, firmware, or combination thereof and using any suitable device architecture(s), wireless network protocol(s), data division scheme(s), wireless air interface(s), and so forth.

Figure 11:
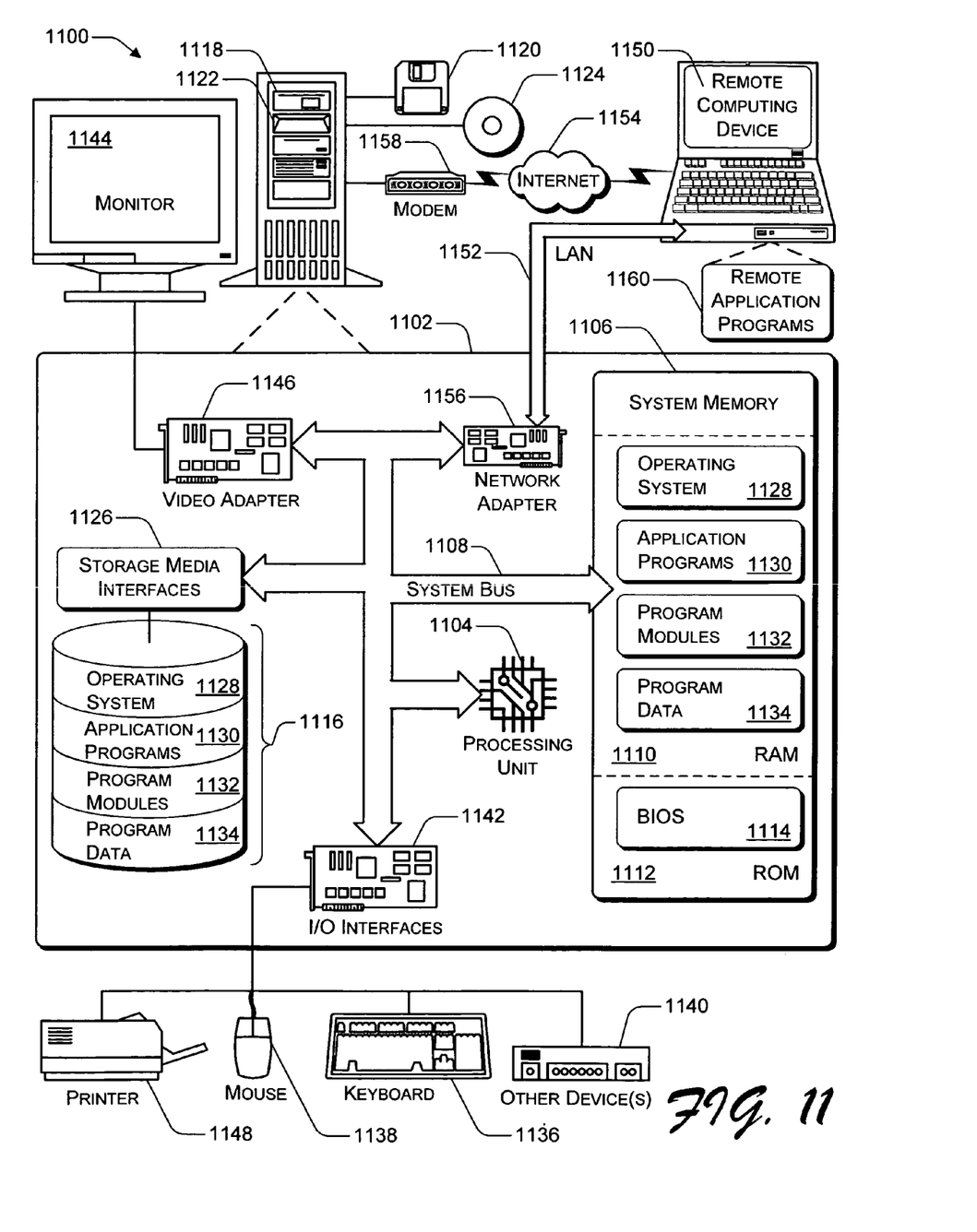
FIG. 11 illustrates an exemplary computing (or general device) operating environment that is capable of (wholly or partially) implementing at least one aspect of adaptive acknowledgment delay as described herein.

FIG. 11 illustrates an exemplary computing (or general device) operating environment 1100 that is capable of (fully or partially) implementing at least one system, device, apparatus, component, arrangement, approach, method, procedure, media, some combination thereof, etc. for adaptive acknowledgment delay implementations as described herein. Operating environment 1100 may be utilized in the computer and network architectures described below.

Exemplary operating environment 1100 is only one example of an environment and is not intended to suggest any limitation as to the scope of use or functionality of the applicable device (including computer, network node, entertainment device, mobile appliance, general electronic device, etc.) architectures. Neither should operating environment 1100 (or the devices thereof) be interpreted as having any dependency or requirement relating to any one or to any combination of components as illustrated in FIG. 11.

Additionally, adaptive acknowledgment delay implementations may be realized with numerous other general purpose or special purpose device (including computing or wireless system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, minicomputers, mainframe computers, wired or wireless network nodes (including general or specialized routers), distributed or multi-processing computing environments that include any of the above systems or devices, some combination thereof, and so forth.

Realizations for adaptive acknowledgment delay implementations may be described in the general context of processor-executable instructions. Generally, processor-executable instructions include routines, programs, modules, protocols, objects, interfaces, components, data structures, etc. that perform and/or enable particular tasks and/or implement particular abstract data types. Adaptive acknowledgment delay implementations, as described in certain embodiments herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Exemplary operating environment 1100 includes a general-purpose computing device in the form of a computer 1102, which may comprise any (e.g., electronic) device with computing/processing capabilities. The components of computer 1102 may include, but are not limited to, one or more processors or processing units 1104, a system memory 1106, and a system bus 1108 that couples various system components including processor 1104 to system memory 1106.

Processors 1104 are not limited by the materials from which they are formed or the processing mechanisms employed therein. For example, processors 1104 may be comprised of semiconductor(s) and/or transistors (e.g., electronic integrated circuits (ICs)). In such a context, processor-executable instructions may be electronically-executable instructions. Alternatively, the mechanisms of or for processors 1104, and thus of or for computer 1102, may include, but are not limited to, quantum computing, optical computing, mechanical computing (e.g., using nanotechnology), and so forth.

System bus 1108 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 1102 typically includes a variety of processor-accessible media. Such media may be any available media that is accessible by computer 1102 or another (e.g., electronic) device, and it includes both volatile and non-volatile media, removable and non-removable media, and storage and transmission media.

System memory 1106 includes processor-accessible storage media in the form of volatile memory, such as random access memory (RAM) 1140, and/or non-volatile memory, such as read only memory (ROM) 1112. A basic input/output system (BIOS) 1114, containing the basic routines that help to transfer information between elements within computer 1102, such as during start-up, is typically stored in ROM 1112. RAM 1110 typically contains data and/or program modules/instructions that are immediately accessible to and/or being presently operated on by processing unit 1104.

Computer 1102 may also include other removable/non-removable and/or volatile/non-volatile storage media. By way of example, FIG. 11 illustrates a hard disk drive or disk drive array 1116 for reading from and writing to a (typically) non-removable, non-volatile magnetic media (not separately shown); a magnetic disk drive 1118 for reading from and writing to a (typically) removable, non-volatile magnetic disk 1120 (e.g., a "floppy disk"); and an optical disk drive 1122 for reading from and/or writing to a (typically) removable, non-volatile optical disk 1124 such as a CD, DVD, or other optical media. Hard disk drive 1116, magnetic disk drive 1118, and optical disk drive 1122 are each connected to system bus 1108 by one or more storage media interfaces 1126. Alternatively, hard disk drive 1116, magnetic disk drive 1118, and optical disk drive 1122 may be connected to system bus 1108 by one or more other separate or combined interfaces (not shown).

The disk drives and their associated processor-accessible media provide non-volatile storage of processor-executable instructions, such as data structures, program modules, and other data for computer 802. Although exemplary computer 1102 illustrates a hard disk 1116, a removable magnetic disk 1120, and a removable optical disk 1124, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the exemplary operating environment 1100.

Any number of program modules (or other units or sets of instructions/code) may be stored on hard disk 1116, magnetic disk 1120, optical disk 1124, ROM 1112, and/or RAM 1140, including by way of general example, an operating system 1128, one or more application programs 1130, other program modules 1132, and program data 1134. Such instructions may include module(s) for joining and participating in an ad hoc wireless network, module(s) for adaptive acknowledgment delay procedures, data structure(s) to store blocks of sprablocks, and so forth.

A user may enter commands and/or information into computer 1102 via input devices such as a keyboard 1136 and a pointing device 1138 (e.g., a "mouse"). Other input devices 1140 (not shown specifically) may include a microphone, joystick, game pad, satellite dish, serial port, scanner, and/or the like. These and other input devices are connected to processing unit 1104 via input/output interfaces 1142 that are coupled to system bus 1108. However, input devices and/or output devices may instead be connected by other interface and bus structures, such as a parallel port, a game port, a universal serial bus (USB) port, an infrared port, an IEEE 1394 ("Firewire") interface, an IEEE 802.11 or 802.15 or other general wireless interface, a Bluetooth® wireless interface, and so forth.

A monitor/view screen 1144 or other type of display device may also be connected to system bus 1108 via an interface, such as a video adapter 1146. Video adapter 1146 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and the performance of graphics operations. In addition to monitor 1144, other output peripheral devices may include components such as speakers (not shown) and a printer 1148, which may be connected to computer 1102 via input/output interfaces 1142.

Computer 1102 may operate in a networked environment using logical connections to one or more remote computers, such as a remote computing device 1150. By way of example, remote computing device 1150 may be a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 1150 is illustrated as a portable computer that may include many or all of the elements and features described herein with respect to computer 1102.

Logical connections between computer 1102 and remote computer 1150 are depicted as a local area network (LAN) 1152 and a general wide area network (WAN) 1154. Another network type establishing logical connections is the aforementioned WPAN. Such networking environments are commonplace in offices, enterprise-wide computer networks, intranets, the Internet, fixed and mobile telephone networks, ad-hoc and infrastructure wireless networks, other wireless networks, gaming networks, some combination thereof, and so forth. Such networks and communications connections are examples of transmission media.

When implemented in a LAN networking environment, computer 1102 is usually connected to LAN 1152 via a network interface or adapter 1156. When implemented in a WAN networking environment, computer 1102 typically includes a modem 1158 or other component for establishing communications over WAN 1154. Modem 1158, which may be internal or external to computer 1102, may be connected to system bus 1108 via input/output interfaces 1142 or any other appropriate mechanism(s). It is to be appreciated that the illustrated network connections are exemplary and that other manners for establishing communication link(s), including wireless link(s) with tranceivers, between computers 1102 and 1150 may be employed.

In a networked environment, such as that illustrated with operating environment 1100, program modules or other instructions that are depicted relative to computer 1102, or portions thereof, may be fully or partially stored in a remote media storage device. By way of example, remote application programs 1160 reside on a memory component of remote computer 1150 but may be usable or otherwise accessible via computer 1102. Also, for purposes of illustration, application programs 1130 and other processor-executable instructions such as operating system 1128 are illustrated herein as discrete blocks, but it is recognized that such programs, components, and other instructions reside at various times in different storage components of computing device 1102 (and/or remote computing device 1150) and are executed by processor(s) 1104 of computer 1102 (and/or those of remote computing device 1150).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

The invention claimed is:

1. A device comprising:
at least one processor; and
one or more media including processor-executable instructions that are capable of being executed by the at least one processor, the processor-executable instructions adapted to direct the device to perform actions comprising:
  determining if all blocks of a current suprablock have been correctly received;
  if all of the blocks of the current suprablock have been correctly received, then adjusting a burst acknowledgment value responsive to a number of blocks received since a most recent erroneous block; and
  if all of the blocks of the current suprablock have not been correctly received, then adjusting the burst acknowledgment value based on a number of remaining unreceived blocks in the current suprablock and a predetermined burst acknowledgment value.

2. The device as recited in claim 1, wherein the device further comprises:
a transceiver;
wherein the processor-executable instructions are adapted to cause the device to perform a further action comprising:
  receiving via the transceiver multiple respective blocks of the current suprablock in multiple respective wireless communications.

3. The device as recited in claim 1, wherein the one or more media further include a buffer;
wherein the processor-executable instructions are adapted to cause the device to perform further actions comprising:
  storing the blocks of the current suprablock in the buffer until all blocks of the current suprablock have been correctly received;
  defragmenting the blocks to reconstitute the current suprablock; and
  forwarding the current suprablock from a data link layer to a higher stack layer of the device.

4. The device as recited in claim 3, wherein the data link layer comprises a medium access control (MAC) layer, the current suprablock comprises a MAC service data unit (MSDU), and the blocks comprise MAC protocol data units (MPDUs).

5. The device as recited in claim 1, wherein the action of adjusting a burst acknowledgment value responsive to a number of blocks received since a most recent erroneous block comprises the actions of:
   comparing the number of blocks received since the most recent erroneous block to an error threshold;
   adjusting the burst acknowledgment value to equal one if the number of blocks received since the most recent erroneous block is less than the error threshold; and
   adjusting the burst acknowledgment value to equal the predetermined burst acknowledgment value if the number of blocks received since the most recent erroneous block is greater than the error threshold.

6. The device as recited in claim 1, wherein the action of adjusting the burst acknowledgment value based on a number of remaining unreceived blocks in the current suprablock and a predetermined burst acknowledgment value comprises the actions of:
   determining if a block forming part of another suprablock has been received;
   if a block forming part of another suprablock has been received, then determining if all of the blocks of the current suprablock have been received either correctly or erroneously; and
   if a block forming part of another suprablock has not been received, then adjusting the burst acknowledgment value to equal a minimum of (i) the number of remaining unreceived blocks in the current suprablock and (ii) the predetermined burst acknowledgment value.

7. The device as recited in claim 6, wherein the action of adjusting the burst acknowledgment value based on a number of remaining unreceived blocks in the current suprablock and a predetermined burst acknowledgment value comprises the further actions of:
   if all of the blocks of the current suprablock have been received either correctly or erroneously, then adjusting the burst acknowledgment value to equal a minimum of (i) the number of remaining unreceived blocks in the current suprablock and (ii) the predetermined burst acknowledgment value; and
   if all of the blocks of the current suprablock have not been received either correctly or erroneously, then jettisoning the blocks of the current suprablock as having been discarded by a source device.

8. The device as recited in claim 1, wherein the processor-executable instructions are further adapted to cause the device to repeat the actions of determining and adjusting at least once during each adjustable burst period, which has a duration established by the burst acknowledgment value.

9. One or more processor-accessible media comprising processor-executable instructions that, when executed, direct a device to perform actions comprising:
   determining if all blocks of a current suprablock have been correctly received;
   if all of the blocks of the current suprablock have been correctly received, adjusting a burst acknowledgment value responsive to a number of blocks received since a most recent erroneous block; and
   if all of the blocks of the current suprablock have not been correctly received, adjusting the burst acknowledgment value based on a number of remaining unreceived blocks in the current suprablock and a predetermined burst acknowledgment value.

10. The one or more processor-accessible media as recited in claim 9, comprising the processor-executable instructions that, when executed, direct the device to perform further actions comprising:
    storing the blocks of the current suprablock until all blocks of the current suprablock have been correctly received;
    defragmenting the blocks to reconstitute the current suprablock; and
    forwarding the current suprablock from a data link layer to a higher stack layer.

11. The one or more processor-accessible media as recited in claim 10, wherein:
    the action of storing further comprises an action of storing MAC protocol data units (MPDUs) of a current MAC service data unit (MSDU) until all MPDUs of the current MSDU have been correctly received;
    the action of defragmenting further comprises an action of defragmenting the MPDUs to reconstitute the current MSDU; and
    the action of forwarding further comprises an action of forwarding the current MSDU from a medium access control (MAC) layer to a higher stack layer.

12. The one or more processor-accessible media as recited in claim 9, wherein the action of adjusting a burst acknowledgment value responsive to a number of blocks received since a most recent erroneous block comprises actions of:
    comparing the number of blocks received since the most recent erroneous block to at least one of a higher error threshold and a lower error threshold;
    adjusting the burst acknowledgment value to equal the predetermined burst acknowledgment value if the number of blocks received since the most recent erroneous block is greater than the higher error threshold; and
    adjusting the burst acknowledgment value to be less than the predetermined burst acknowledgment value but greater than one if the number of blocks received since the most recent erroneous block is less than the higher error threshold but greater than the lower error threshold.

13. The one or more processor-accessible media as recited in claim 12, wherein the action of adjusting a burst acknowledgment value responsive to a number of blocks received since a most recent erroneous block comprises a further action of:
    adjusting the burst acknowledgment value to equal one if the number of blocks received since the most recent erroneous block is less than the lower error threshold.

14. The one or more processor-accessible media as recited in claim 9, wherein the action of adjusting the burst acknowledgment value based on a number of remaining unreceived blocks in the current suprablock and a predetermined burst acknowledgment value comprises actions of:
    determining if a block forming part of another suprablock has been received;
    if a block forming part of another suprablock has been received, determining if all of the blocks of the current suprablock have been received correctly or erroneously; and
    if a block forming part of another suprablock has not been received, adjusting the burst acknowledgment value to equal a minimum of (i) the number of remaining unreceived blocks in the current suprablock and (ii) the predetermined burst acknowledgment value.

15. The one or more processor-accessible media as recited in claim 14, wherein the action of adjusting the burst acknowledgment value based on a number of remaining unreceived blocks in the current suprablock and a predetermined burst acknowledgment value comprises further actions of:
- if all of the blocks of the current suprablock have been received correctly or erroneously, adjusting the burst acknowledgment value to equal a minimum of (i) the number of remaining unreceived blocks in the current suprablock and (ii) the predetermined burst acknowledgment value; and
- if all of the blocks of the current suprablock have not been received correctly or erroneously, jettisoning the blocks of the current suprablock as having been discarded by a source.

16. The one or more processor-accessible media as recited in claim 9, wherein the one or more processor-accessible media comprise at least one of (i) one or more storage media and (ii) one or more transmission media.

* * * * *